May 21, 1968     L. L. VANT-HULL     3,384,847
APPARATUS FOR EXCLUDING MAGNETIC FIELDS
Filed April 7, 1965
Fig. 1
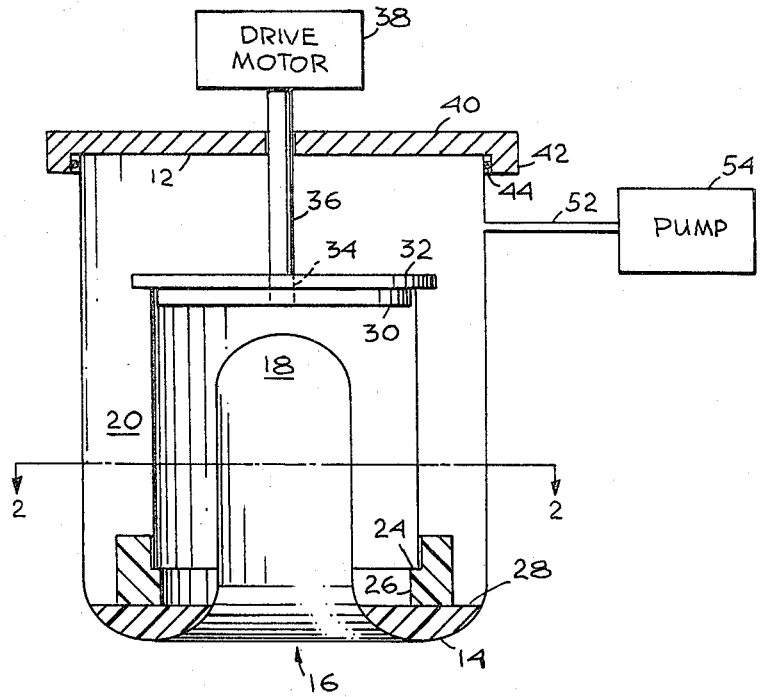
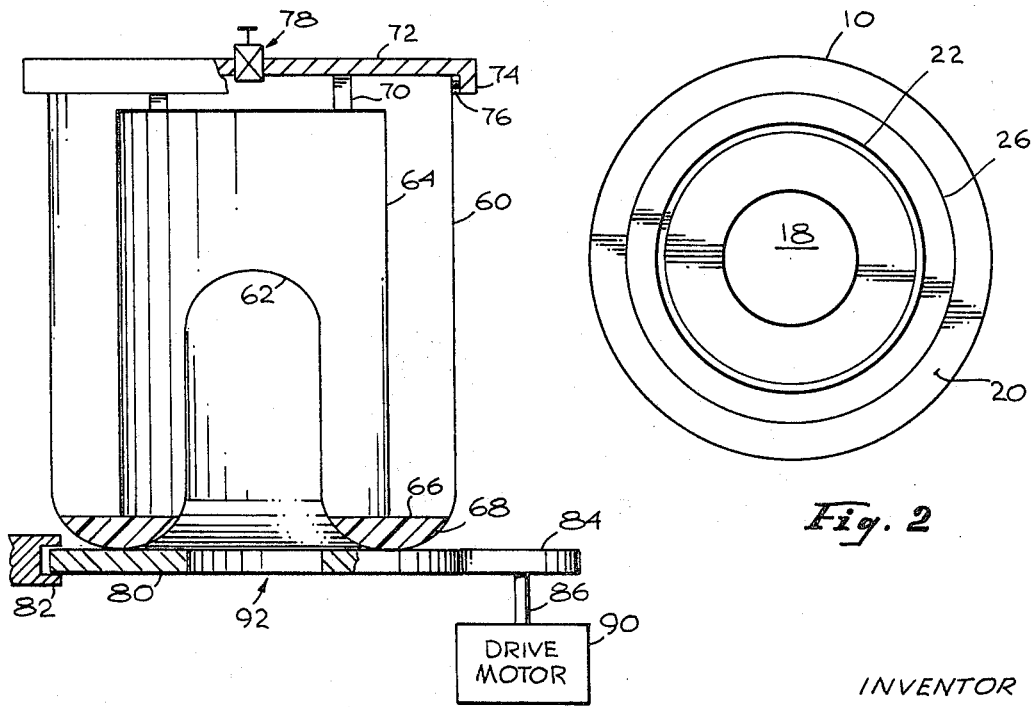
Fig. 2
Fig. 3
INVENTOR
LORIN L. VANT-HULL
BY Semmel Lindenberg
Arthur Freilich
ATTORNEYS

# United States Patent Office 3,384,847
Patented May 21, 1968

3,384,847
APPARATUS FOR EXCLUDING
MAGNETIC FIELDS
Lorin L. Vant-Hull, Pasadena, Calif., assignor to California
Institute Research Foundation, Pasadena, Calif., a corporation of California
Filed Apr. 7, 1965, Ser. No. 446,273
8 Claims. (Cl. 335—216)

This invention relates generally to improved apparatus for creating and maintaining extremely low magnetic field regions.

U.S. patent application Ser. No. 409,835, filed Nov. 9, 1964 by Lorin L. Vant-Hull et al., now Patent No. 3,346,826 and assigned to the same assignee as the present application discloses amongst other things, a method and apparatus for creating and maintaining extremely low magnetic field regions. More particularly, in accordance with one aspect of that patent application, a low magnetic field region is created within a hollow metal cylinder by rotating the cylinder relative to an ambient magnetic field and cooling it to a superconducting state while it is rotating. The relative motion between the conductive cylinder and the magnetic field induces eddy currents in the cylinder which tend to exclude the non-axial component of the external field from the interior of the cylinder. By subsequently slowly cooling the rotating cylinder to a superconducting state, the eddy current shielding is greatly enhanced by the super currents which are induced. As these super currents are self-maintaining, the relative motion between the field and the cylinder is no longer required to exclude the field from the interior of the cylinder.

In one embodiment of the invention disclosed in the cited patent application, a substantially conventional Dewar flask is provided. The flask is filled with a coolant, such as liquid helium, and is sealed by a cover plate. A hollow conductive cylinder is rotatably supported within the coolant. A shaft from an external drive motor extends through the cover plate and is coupled to the cylinder for rotating it. While the cylinder is rotating, the temperature of the coolant is lowered, as for example, by pumping the pressure down in the flask, to thus drive the cylinder to a superconducting state. Access to the field free region within the cylinder is gained through the cover plate. In an alternative embodiment, in order to provide a room temperature field free region, a portion of the Dewar flask (or an additional smaller Dewar flask) can project into the cylinder to thus provide access to the cylinder interior outside of the Dewar flask.

It is an object of the present invention to provide an improved apparatus in which a region substantially free of horizontal magnetic fields is available at non-critical temperature levels, e.g. room temperature.

Briefly, in accordance with a first aspect of the present invention, a reentrant Dewar flask is provided having an upwardly projecting central portion in the bottom thereof. A conductive cylinder is adapted to be supported within the flask around the upwardly projecting portion thus enabling a magnetic field free region to be provided at non-critical temperatures immediately beneath the upwardly projecting portion. A flask configuration of this type is extremely useful inasmuch as it permits the drive shaft for rotating the cylinder to enter the flask through the cover plate or in other words, from the end of the flask remote from the end providing access to the field free region.

In accordance with a second aspect of the invention, an apparatus, and mode of operation therefor, is disclosed which requires no moving parts within the Dewar flask but rather creates relative motion between the cylinder and the magnetic field by fixing the cylinder within the flask and rotating the entire flask. In accordance with a further aspect of the invention, it is recognized that by choosing a cylinder whose transition temperature is above that of the coolant at atmospheric pressure, the necessity of having tubing, as for a pump, to the flask during operation can be avoided. More particularly, the coolant can initially be held under pressure to thus keep the temperature of the coolant above the transition temperature of the cylinder. The cylinder can then be slowly cooled to a superconducting state by opening a valve in the flask to thus relieve the pressure and reduce the temperature of the coolant, while rotating the entire assembly.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 1 is a vertical sectional view taken substantially through the center of a first embodiment of the present invention;

FIGURE 2 is a horizontal sectional view taken substantially along the plane 2—2 of FIGURE 1; and FIGURE 3 is a vertical sectional view taken through the center of a second embodiment of the invention.

Initial attention is called to FIGURES 1 and 2 of the drawings which illustrate a first embodiment of applicant's invention which embodiment is useful for providing a readily accessible magnetic field free region at non-critical temperatures, e.g. room temperature. The apparatus of FIGURE 1 includes a Dewar flask 10 open at its top end 12 and closed at its bottom end by wall 14.

The center segment 16 of the bottom wall 14 of the Dewar flask projects upwardly as illustrated in FIGURE 1 to thereby define a substantially cylindrical protuberance 18 within the flask 10. Thus, a substantially doughnut-shaped volume 20 is defined within the flask 10 around the protuberance 18.

A hollow conductive cylinder 22 is adapted to be supported within the flask 10 around the protuberance 18 and on a bearing seat 24 defined by a circular bearing block 26. The bearing block 26 is supported on a horizontally oriented surface 28 supported within the flask above the bottom wall 14.

The upper end of the cylinder 22 is open and receives therein a reduced portion 30 of a plug 32. The plug has a center hole 34 therein which receives the end of shaft 36 extending from drive motor 38. The shaft 36 extends through and is journalled in a bearing surface in an opening defined in cover plate 40 adapted to close the upper end of flask 10. The cover plate 40 has a downwardly projecting lip 42 which preferably carries an O-ring seal 44 which thus forms a seal between the outer surface of the flask walls and the inner surface of the lip 42. A tube 52 communicates with the interior of the flask 10 and is adapted to be coupled to a pump 54.

In the utilization of the apparatus of FIGURES 1 and 2, a coolant, such as liquid helium, is provided within the flask 10. At atmospheric pressures, liquid helium will normally have a temperature of about 4.2° Kelvin. The cylinder 22 is constructed of a material which can be cooled to a superconducting state. Thus, a tin cylinder can be employed which goes through a transition to a superconducting state at about 3.7° K. With the apparatus thus far recited, a region substantially free of horizontal magnetic fields at non-critical temperatures can be provided outside of the flask 10 but within the cylinder 22 or in other words, beneath the protuberance 18. As explained in greater detail in the aforecited patent application, a horizontal magnetic field can be excluded from within the cylinder 22 by initially rotating the cylinder to set up eddy currents therein which tend to exclude the magnetic field from the interior volume of the cylinder. By cooling the cylinder to a superconducting state while it is rotating, these eddy currents will develop into super currents which substantially improve the field exclusion and which will thereafter be self-maintaining and will act to exclude the magnetic field even after rotation of the cylinder ceases. The temperature of the coolant within the flask 10 can be lowered by lowering the pressure within the flask through the use of the pump 54 coupled to the flask interior by tube 52. An apparatus having the geometry illustrated in FIGURES 1 and 2 is particularly valuable because it enables the drive shaft 36 for rotating the cylinder to project out of the flask 10 at the top end or in other words, remote from the bottom end which provides access to the field free region. Thus, the cylinder may be driven by an axial drive shaft, rather than through circumferential gears etc.

Although many constructional details of the apparatus thus far described have not been set forth, it should of course be appreciated that the apparatus must be constructed with a fair amount of precision in order to permit it to satisfactorily operate in the required temperature range. Thus, for example, care should be exercised in fabricating the cylinder to assure that all of its surfaces are smooth. For example, if a seam is required in the cylinder, the edges adjacent thereto should be carefully mated to thus minimize any frictional heating effects which would otherwise occur as the cylinder is rotated in the coolant. Moreover, although the dimensions of the apparatus are not critical, many of the dimensions should be slightly oversized at room temperature to compensate for thermal contraction to permit smooth operation at superconducting temperatures. The length, diameter, and thickness dimensions of an exemplary cylinder are respectively on the order of 20 cm., 2.4 cm. and 0.1 cm. Preferably, the bearing surfaces can be formed of Teflon. The relative dimensions should however be so chosen to avoid any adverse effects of localized heating which would make it difficult for the cylinder to be brought into a superconducting state.

Attention is now called to FIGURE 3 which illustrates a second embodiment of the invention and is based upon the recognition that if the cylinder is constructed of a material which has a transition temperature greater than 4.2° K., i.e. the temperature of helium at atmospheric pressure, an apparatus can be constructed which does not require tubing to couple it to external pumps during operation. By eliminating the tubing between the flask and external devices, the apparatus can be simplified by fixing the cylinder within the flask and rotating the entire flask relative to the magnetic field, rather than by rotating the cylinder alone. The flask can be rotated by merely supporting it on a driven turntable and thus the equipment required within the flask is considerably simplified.

As shown in FIGURE 3, the second embodiment of the invention can utilize a flask 60 having a shape substantially identical to that of flask 10 of FIGURES 1 and 2. The flask 60 may have a protuberance 62 projecting upwardly from the bottom wall thereof. A cylinder 64 is supported around the protuberance 62 or within the flask wall 60 and rests on the substantially horizontal surface 66 defined above the bottom surface 68 of the flask.

The cylinder 64 can be formed of a metal such as tantalum whose transition temperature is approximately 4.5° or of any one of several different alloys such as indium lead or gold lead each having transition temperatures equal to approximately 4.4° K. The cylinder 64 can be supported by straps 70 suspended from a cover plate 72. The cover plate 72 has an annular downwardly projecting lip 74 retaining an O-ring seal between itself and the outer surface of the wall of flask 60. The cover plate 72 carries a valve 78 which can communicate the interior of the flask 60 with the exterior or in other words with ambient pressure.

In the use of the apparatus of FIGURE 3, it is contemplated that the flask 60 be supported on a turntable 80 adapted to rotate in an edge bearing 82. The turntable 80 can be driven by a friction drive wheel 84 carried by a drive shaft 86 of drive motor 90. The turntable 80 has an opening 92 in the center thereof which provides access to the region beneath the protuberance 62 and within the cylinder 64.

In the utilization of the embodiment of FIGURE 3, the cover plate 72 is put on the flask 60 thereby properly locating the cylinder 64 relative to the protuberance 62. The pressure within the flask 60 can then be increased to increase the temperature of the liquid helium either by positively increasing the pressure within the flask or by permitting the normal heat leakage to boil away some of the liquid helium to thus increase the pressure. In any event, the temperature of the liquid helium is thus raised to a level greater than the transition temperature of the metal forming the cylinder 64. The flask 60 is then rotated by turning the turntable 80. As previously pointed out, eddy currents are thus set up in the cylinder 64 which tend to exclude the magnetic field from the interior thereof. The liquid helium is then cooled to 4.2° K. by opening the valve 78 to reduce the pressure within the flask 60 to atmospheric pressure. Thus, the cylinder 64 becomes superconducting to thereby continue to exclude the magnetic field from within the cylinder even after rotation has stopped. Access to the field free region beneath the protuberance 62 is of course available through the hole 92 defined in the turntable 80. If no hole has been provided, it is of course a simple matter to move the Dewar to any convenient experimental location.

From the foregoing, it should be appreciated that a first embodiment of the invention has been disclosed herein which has a preferred geometry in that it conveniently provides access to a substantially magnetic field free region. That is, access to the field free region is available remote from the shaft for driving the conductive cylinder within the flask. In the second embodiment of the invention, an apparatus is provided in which no moving elements need be provided within the Dewar flask. Although the second embodiment of the invention has been illustrated using the same flask geometry as in the first embodiment, it should be appreciated that a different flask geometry which for example provides access to the field free region from above, could be employed which still does not require moving parts within the flask.

Although the present disclosure is primarily directed to an improved method and apparatus for creating field free regions, it should further be appreciated that the invention finds use in other applications, as for example, for measuring resistivity as described in the aforecited patent application.

What is claimed is:

1. An apparatus for substantially excluding a magnetic field from a specified region comprising a hollow container having a wall defining an inwardly projecting protuberance; a hollow conductive cylinder defining said specified region and supported within said container around said protuberance and substantially concentric therewith; means for rotating said cylinder to induce eddy currents therein; and means for cooling said cylinder within said container to a superconducting state.

2. An apparatus for substantially excluding a magnetic field from a specified region including a hollow container having an external wall of substantially uniform thickness; a hollow conductive cylinder supported within said container and defining said specified region within; said container wall defining a protuberance projecting into said container and into said specified region; means for rotating said cylinder to thereby induce eddy currents therein; and means for cooling said cylinder within said container to a superconducting state.

3. The apparatus of claim 2 wherein said means for cooling includes a coolant in said container in contact with said cylinder; and means for selectively lowering the temperature of said coolant to below the transition temperature of said conductive cylinder.

4. The apparatus of claim 2 wherein said cylinder is fixedly secured relative to said container; and wherein said means for rotating said cylinder comprises means for rotating said container.

5. The apparatus of claim 2 wherein said cylinder is rotatably mounted within said container.

6. In an apparatus for excluding magnetic fields; a container having first and second ends and a wall defining a protuberance projecting inwardly from said first toward said second end; a hollow conductive cylinder rotatably supported within said container around said protuberance and substantially concentric therewith; a drive shaft extending into said container from said second end thereof and coupled to said cylinder for rotating it relative to said container; and means for cooling said cylinder within said container to a superconducting state.

7. The apparatus of claim 6 wherein said means for cooling includes a coolant in said container in contact with said cylinder, and means for selectively lowering the temperature of said coolant to below the transition temperature of said conductive cylinder.

8. In an apparatus for excluding magnetic fields; a Dewar flask having first and second ends and a wall defining a protuberance projecting inwardly from said first toward said second end; a hollow conductive cylinder rotatably supported within said flask around said protuberance and substantially concentric therewith; a liquified gas within said container and in intimate contact with said cylinder; a drive shaft extending into said flask from the second end thereof and coupled to said cylinder for rotating it relative to said flask; and means for selectively lowering the temperature of said liquified gas to below the transition temperature of said cylinder.

References Cited

Babiskin, J.: Magnetic Properties of a Hollow Superconducting Lead Sphere, Physical Review, vol. 33, No. 1, January 1952, pp. 104–106.

BERNARD A. GILHEANY, *Primary Examiner.*

G. HARRIS, Jr., *Examiner.*